(12) United States Patent
Kaizu

(10) Patent No.: US 6,398,684 B1
(45) Date of Patent: Jun. 4, 2002

(54) CONTROL DEVICE OF AUTOMATIC TRANSMISSION

(75) Inventor: Kenichi Kaizu, Fuji (JP)

(73) Assignee: Jatco Transtechnology Ltd. (JP)

( * ) Notice: Subject to any disclaimer, the term of this patent is extended or adjusted under 35 U.S.C. 154(b) by 0 days.

(21) Appl. No.: 09/664,044

(22) Filed: Sep. 18, 2000

(30) Foreign Application Priority Data

Sep. 21, 1999 (JP) .............................. 11-267280

(51) Int. Cl.$^7$ .............................................. F16H 61/12
(52) U.S. Cl. ...................... 475/127; 475/116; 477/906
(58) Field of Search ................................. 475/116, 119, 475/120, 127; 477/906, 907

(56) References Cited

U.S. PATENT DOCUMENTS

| | | | | |
|---|---|---|---|---|
| 4,981,052 A | * | 1/1991 | Gierer ........................ | 477/125 |
| 5,941,794 A | * | 8/1999 | Jang ........................... | 477/143 |
| 6,077,182 A | * | 6/2000 | Long et al. ................. | 475/128 |
| 6,102,826 A | * | 8/2000 | Takahashi et al. .......... | 475/119 |

* cited by examiner

Primary Examiner—Rodney H. Bonck
Assistant Examiner—Ankur Parekh
(74) Attorney, Agent, or Firm—Rossi & Associates

(57) ABSTRACT

In a control device of an automatic transmission that controls a plurality of solenoid valves by an ATCU to thereby supply and release signal pressure for controlling friction elements according to selected gear positions, the solenoid valves generate a signal pressure to be supplied to the friction elements which are engaged at a predetermined gear position in a low speed gear position group, when the ATCU stops functioning while the vehicle is driven at a low speed gear position. Shift valves supply the signal pressure to the friction elements. If the ATCU stops functioning while a gear position in a high speed gear position group is selected, the shift valves supply a signal pressure generated by manual valve to friction elements which are engaged at a predetermined gear position in the high speed gear position group. Thus, if the ATCU stops functioning while the vehicle is running, the gear position is fixed at a gear position at which a vehicle has been driven or is shifted up in order to prevent the deterioration of driving performance resulting from a down-shift.

6 Claims, 12 Drawing Sheets

Fig.2

| Gear Position | C1 | C2 | C3 | B1 | B2 | OW1 |
|---|---|---|---|---|---|---|
| 1st | ○ | | | | | ● |
| 2nd | ○ | | | | ○ | |
| 3rd | ○ | ○ | | | | |
| 4th | ○ | | ○ | | | |
| 5th | | ○ | ○ | | | |
| 6th | | | ○ | | ○ | |
| Rev. | | ○ | | ○ | | |

Fig. 8

| Gear Position | SA(C1) | SB(C2) | SC(B2) | SD(C3) | SE |
|---|---|---|---|---|---|
| 1st | H | L | L | L | H |
| 2nd | H | L | H | L | H |
| 3rd | H | H | L | L | H |
| 4th | H | L | L | H | H |
| 5th | L | H | L | H | H |
| 6th | L | L | H | H | H |

CONTROL DEVICE OF AUTOMATIC TRANSMISSION

BACKGROUND OF THE INVENTION

1. Field of the Invention

The present invention relates to a control device of an automatic transmission for vehicles.

2. Description of the Prior Art

An example of conventional automatic transmission comprises a main transmission arranged coaxially with a torque converter and having planetary gear mechanisms, and a sub transmission arranged in parallel with the main transmission. The control device of the automatic transmission achieves a plurality of gear positions by engaging and disengaging friction elements such as clutches, brakes and one-way clutches.

In this type of control device, an automatic transmission control unit (hereinafter referred to as an ATCU) determines a gear position suitable for driving conditions, and on-off controls solenoid valves in the control device. The gear positions are changed by supplying and releasing an oil pressure supplied through the solenoid valves to and from friction elements by an oil pressure circuit comprised of shift valves and the like.

In the control device that is constructed in the above-mentioned manner, if there is a problem in the ATCU or the like, it is impossible to control the solenoid valves for determining the gear positions, and therefore, the gear position may be fixed at a specific gear position.

To address this problem, the oil pressure circuit in the conventional control device of the automatic transmission is constructed in such a manner that the gear position shifts to an intermediate gear position or a low speed gear position in order to insure a driving performance after the problem occurs.

In recent years, however, the number of gear positions have been increased so as to control a driving characteristic in a more refined manner in order to reduce energy consumption and the like. An automatic transmission with five gear positions has already been developed, and an automatic transmission with six gear positions is now being studied.

Accordingly, while a vehicle is driven at the high speed gear position such as the sixth speed gear position or the fifth speed gear position, if a problem occurs and the high speed gear position is shifted to an intermediate gear position such as the third speed gear position or a low speed gear position such as the second speed gear position, the abrupt downshift may cause deterioration of the driving performance.

In order to prevent the gear position from shifting to the intermediate gear position or the low speed gear position, the control device may be constructed in such a manner that the gear position is shifted up to a highest speed gear position irrespective of the present gear position when there occurs a problem, In this case, however, the driving performance may deteriorate if the gear position is abruptly shifted up to the highest gear speed while a vehicle is driven at the low speed gear position.

SUMMARY OF THE INVENTION

It is therefore an object of the present invention to provide a control device of an automatic transmission, which prevents the deterioration of driving performance even if there is a problem during driving.

According to the first aspect of the present invention, the control device of the automatic transmission, which comprises a plurality of gear position selecting signal pressure generating means that supplies and releases signal pressure for controlling engagement and disengagement of a plurality of friction elements, and shift control means that controls the gear position selecting signal pressure generating means according to gear positions selected by an automatic shift or a manual shift in order to achieve a plurality of forward driving gear positions by engagement and disengagement of the plurality of friction elements, is characterized in that:

the plurality of forward driving gear positions comprises at least a low speed gear position group composed of multiple forward driving gear positions including a lowest speed gear position and a high speed gear position group composed of multiple forward driving gear positions with higher speeds than the low speed gear position group;

the plurality of gear position selecting signal pressure generating means generates signal pressure to be supplied to friction elements, which are engaged at a predetermined gear position in the low speed gear position group, when the shift control means stops functioning; and the control device of the automatic transmission comprises:

high speed gear position signal pressure generating means that generates signal pressure to be supplied to friction elements, which are engaged at a predetermined gear position in the high speed gear position group;

low speed gear position failsafe means that supplies the friction elements which are engaged at the predetermined gear position in the low speed gear position group with the signal pressure generated by the gear position selecting signal pressure generating means if the shift control means stops functioning when the shift control means selects a gear position in the low speed gear position group; and high speed gear position failsafe means that supplies the friction elements which are engaged at the predetermined gear position in the high speed gear position group with the signal pressure generated by the high speed gear position signal pressure generating means if the shift control means stops functioning when the shift control means selects a gear position in the high speed gear position group.

Accordingly, if the shift control means stops functioning while a vehicle is driven at a gear position in a low speed gear position group, the low speed gear position failsafe means supplies the friction elements with the signal pressure outputted from the gear position selecting signal pressure generating means. When the shift control means stops functioning, the gear position selecting signal pressure generating means generates the signal pressure to be supplied to the friction elements that are engaged at a predetermined gear position in the low speed gear position group. Thus, a predetermined gear position in the low speed gear position group is engaged.

If the shift control means stops functioning while the vehicle is driven at a gear position in the high speed gear position group, the high speed gear position failsafe means supplies the friction elements with the signal pressure outputted from the high speed gear position signal pressure generating means. When the shift control means stops functioning, the high speed gear position signal pressure generating means generates the signal pressure to be supplied to the friction elements that are engaged at a predetermined gear position in the high speed gear position group.

Thus, a predetermined gear position in the high speed gear position group is engaged.

Therefore, when the shift control means stops functioning, the gear position is fixed at the gear position at which the vehicle has been driven, or is switched to and fixed at a gear position in the same gear position group whether the vehicle is driven at a low speed gear position or a high speed gear position. This prevents the down-shift from the high speed gear position group to the low speed gear position group, or the up-shift from the low speed gear position group to the high speed gear position group, thereby preventing the deterioration of the driving performance.

According to the second aspect of the present invention, the control device of an automatic transmission, which comprises a plurality of gear position selecting signal pressure generating means that supplies and releases signal pressure for controlling engagement and disengagement of a plurality of friction elements, and shift control means that controls the gear position selecting signal pressure generating means according to gear positions selected by an automatic shift or a manual shift in order to achieve a plurality of forward driving gear positions by engagement and disengagement of the plurality of friction elements, is characterized in that:

the plurality of forward driving gear positions comprises at least a low speed gear position group composed of multiple forward driving gear positions including a lowest speed gear position and a high speed gear position group composed of multiple forward driving gear positions with higher speeds than the low speed gear position group;

the plurality of gear position selecting signal pressure generating means generates signal pressure to be supplied to friction elements, which are engaged at a predetermined gear position in the low speed gear position group, when the shift control means stops functioning; and the control device of the automatic transmission comprises:

high speed gear position signal pressure generating means that generates signal pressure to be supplied to friction elements, which are engaged at a predetermined gear position in the high speed gear position group;

a failsafe valve that supplies the friction elements which are engaged at the predetermined gear position in the low speed gear position group with the signal pressure generated by the plurality of gear position selecting signal pressure generating means at a first switching position, and supplies the friction elements which are engaged at the predetermined gear position in the high speed gear position group with the signal pressure generated from the high speed gear position signal pressure generating means at a second switching position;

a high speed gear position storage valve that supplies and releases a high speed gear position storage signal pressure for controlling the switching positions of the failsafe valve;

a high speed gear position storage cancel valve that supplies and releases original pressure of the high speed gear position storage signal pressure to and from the high speed gear position storage valve;

abnormality sensing means that supplies the failsafe valve with a normal operation signal pressure when the shift control means is operating normally, and stops the supply of the normal operation signal pressure when the shift control means stops functioning;

wherein when the shift control means selects a gear position in a high speed gear position group, the high speed gear position storage valve supplies the high speed gear position storage signal pressure and stores the supplied state of the high speed gear position storage pressure by self-maintaining the switching state by the high speed gear position storage signal pressure, and if the shift control means stops functioning when the shift control means selects a shift position in a high speed gear position group, the high speed gear position storage valve continues supplying the high speed gear position signal pressure;

when the shift control means selects a gear position in the low speed gear position group, the high speed gear position storage cancel valve stops supplying the original pressure of the high speed gear position storage signal pressure to thereby cancel the self-maintenance of the switching state in the high speed gear position storage valve and cancel the storage of the supplied state of the high speed gear position storage signal pressure; and if the normal operation signal pressure only is supplied or if neither the normal operation signal pressure nor the high speed gear position storage signal pressure is supplied, the failsafe valve is switched to a first switching position, and if the high speed gear position storage signal pressure is only supplied, the failsafe valve is switched to a second switching position.

While the vehicle is driven at a gear position in the low speed gear position group, the abnormality sensing means supplies the failsafe valve with the normal operation signal pressure, and the failsafe vale is switched to the first switching position.

If the shift control means stops functioning at this time, the supply of the normal operation signal from the abnormality sensing means is stopped. On the other hand, the high speed gear position storage valve does not supply the high speed gear position storage signal pressure to the failsafe valve. For this reason, the failsafe vale is not supplied with the normal operation signal pressure or the high speed gear position storage signal pressure, and the failsafe valve is fixed at the first switching position.

At the first switching position, the failsafe vale supplies the friction elements which are engaged at the predetermined gear position in the low speed gear position group with the signal pressure generated from the gear position selecting signal pressure generating means. Since the shift control means does not function normally, the gear position selecting signal pressure generating means generates the signal pressure to be supplied to the friction elements, which are engaged at a predetermined gear position in the low speed gear position group.

Therefore, the friction elements are engaged in such a manner as to select a predetermined gear position in the low speed gear position group.

Thus, if the shift control means stops operating normally while the vehicle is driven at a gear position in the low speed gear position group, the gear position is switched to and fixed at a gear position in the low speed gear position group.

While the vehicle is driven at a gear position in the high speed gear position group, the abnormality sensing means supplies the normal operation signal to the failsafe valve, which is switched to the first switching position. At this time, the high speed gear position storage cancel valve supplies the high speed gear position storage valve with the original pressure of the high speed gear position storage signal pressure. The high speed gear position storage valve supplies the failsafe valve with the high speed gear position storage signal pressure, and the high speed gear position storage valve self-maintains the switching state by the high speed gear position storage signal pressure. Since the abnormality sensing means supplies the failsafe valve with the normal operation signal pressure, the switching state of the failsafe valve is unchanged from the first switching state.

If, however, the shift control means stops functioning, the abnormality sensing means stops supplying the normal operation signal pressure. Thus, the failsafe valve is not supplied with the normal operation signal pressure. On the other hand, the high speed gear position storage cancel valve supplies the high speed gear position storage valve with the original pressure of the high speed gear position storage signal pressure, and thus, the high speed gear position storage valve supplies the failsafe valve with the high speed gear position storage signal pressure, and the high speed gear position storage valve self-maintains the switching state by the high speed gear position storage signal pressure. For this reason, the failsafe valve is only supplied with the high speed gear position storage signal pressure, and the failsafe valve is switched to the second switching position.

At the second switching position, the failsafe valve supplies the friction elements which are engaged at the predetermined gear position in the high speed gear position group with the signal pressure generated from the high speed gear position signal pressure generating means, and thus, the friction elements are engaged in such a manner as to select a predetermined gear position in the high speed gear position group.

Therefore, if the shift control means stops functioning normally while the vehicle is driven at a gear position in the high speed gear position group, the gear position is switched to and fixed at a predetermined gear position in the high speed gear position group.

When a gear position in the high speed gear position group is switched to a gear position in the low speed gear position group, the high speed gear position storage cancel valve stops supplying the original pressure of the high speed gear position storage signal pressure and cancels the self-maintaining state of the high speed gear position storage valve.

Therefore, if a gear position in the high speed gear position group is switched to a gear position in the low speed gear position group, the high speed gear position storage valve stops outputting the high speed gear position storage signal pressure.

For this reason, when the shift control means stops functioning, the gear position is fixed at a gear position at which the vehicle has been driven, or is switched to and fixed at a gear position in the same gear position group whether the vehicle is driven at a low speed gear position or a high speed gear position. This prevents the down-shift from the high gear position to the low speed gear position group, and the up-shift from the low gear position to the high speed gear position group, thereby preventing the deterioration of the driving performance.

According to the first and second aspects, the plurality of gear position selecting signal pressure generating means may generate the signal pressure to be supplied to the friction elements, which are engaged at the highest speed gear position in the low speed gear position group when the shift control means stops functioning.

Therefore, if the shift control means stops functioning while the vehicle is driven at a gear position in the low speed gear position group, the gear position selecting signal pressure generating means generates the signal pressure to be supplied to the friction elements that are engaged at the highest speed gear position in the low speed gear position group. Thus, the highest speed gear position in the low speed gear position group is engaged.

If down-shift occurs in the low speed gear position group, the great change of the driving performance is caused. However, in this embodiment the gear position is fixed at a gear position at which the vehicle has been driven, or is switched to and fixed at a higher speed gear position if the shift control means stops functioning while the vehicle is driven at a low gear position. Thus, there is no down-shift, and this prevents the deterioration of the driving performance more effectively.

According to the third aspect of the present invention, the control device of the automatic transmission, which comprises a plurality of gear position selecting signal pressure generating means that supplies and releases signal pressure for controlling engagement and disengagement of a plurality of friction elements, and shift control means that controls the gear position selecting signal pressure generating means according to gear positions selected by an automatic shift or a manual shift in order to achieve a plurality of forward driving gear positions by engagement and disengagement of the plurality of friction elements, is characterized in that:

the plurality of forward driving gear positions comprises at least a low speed gear position group composed of multiple forward driving gear positions including a lowest speed gear position and a high speed gear position group composed of multiple forward gear positions with higher speeds than the low speed gear position group;

the plurality of gear position selecting signal pressure generating means generates signal pressure to be supplied to friction elements, which are engaged at a highest gear position in the low speed gear position group, when the shift control means stops functioning; and the control device of the automatic transmission comprises:

high speed gear position signal pressure generating means that generates signal pressure to be supplied to friction elements, which are engaged at a highest speed gear position in the high speed gear position group;

a failsafe shift valve that supplies the friction elements which are engaged at a highest gear position in the low speed gear position group with the signal pressure generated by the plurality of gear position selecting signal pressure generating means at a first switching position, and supplies the friction elements which are engaged at a highest speed gear position in the high speed gear position group with the signal pressure generated from the high speed gear position signal pressure generating means at a second switching position;

a high speed gear position storage shift valve that supplies and releases a high speed gear position storage signal pressure for controlling shift positions of the failsafe shift valve;

a high speed gear position storage cancel shift valve that supplies and releases original pressure of the high speed gear position storage signal pressure to and from the high speed gear position storage shift valve;

abnormality sensing means that supplies the failsafe shift valve and the high speed gear position storage cancel shift valve with normal operation signal pressure for controlling shift positions when the shift control means is operating normally, and stops supplying the normal operation signal pressure when the shift control means stops functioning;

high speed gear position selecting signal pressure generating means that supplies the high speed gear position storage shift valve and the high speed gear position storage cancel shift valve with high speed gear position selecting signal pressure for controlling shift positions when the shift control means selects a gear position in the high speed gear position group;

wherein the high speed gear position storage cancel shift valve supplies the high speed gear position storage shift valve with the original pressure of the high speed gear position storage signal pressure when both the normal operation signal pressure and the high speed gear position selecting signal pressure are supplied or when neither the normal operation signal pressure nor the high speed gear position selecting signal pressure are supplied;

the high speed gear position storage shift valve controls shift positions thereof by the high speed gear position storage signal pressure, and supplies the high speed gear position storage signal pressure to the failsafe shift valve when the high speed gear position selecting signal pressure and the original pressure of the high speed gear position storage signal pressure are supplied or when the supply of the high speed gear position selecting signal pressure is stopped in a state wherein the high speed gear position selecting signal pressure and the original pressure of the high speed gear position storage signal pressure are supplied; and if the normal operation signal pressure only is supplied or if neither the normal operation signal pressure nor the high speed gear position storage signal pressure are supplied, the failsafe shift valve is switched to a first shift position, and if the normal operation signal pressure is not supplied and the high speed gear position storage signal only is supplied, the failsafe shift valve is switched to a second shift position.

Accordingly, while the vehicle is driven at a gear position in the low speed gear position group, the abnormality sensing means supplies the normal operation signal pressure to the failsafe shift valve, which is shifted to the first shift position.

If the shift control means stops functioning at this condition, the abnormality sensing means stops supplying the normal operation signal pressure. On the other hand, the high speed gear position storage shift valve does not supply the high speed gear position storage signal pressure to the failsafe shift valve or the high speed gear position storage shift valve itself. Therefore, the failsafe shift valve is fixed at the first shift position since the failsafe shift valve is not supplied with the normal operation signal pressure or the high speed gear position storage signal pressure.

At the first shift position, the failsafe shift valve supplies the friction elements with the signal pressure generated from the gear position selecting signal pressure generating means. Since the shift control means does not function normally, the gear position selecting signal pressure generating means generates the signal pressure to be supplied to the friction elements that are engaged at the highest speed gear position in the low speed gear position group.

Accordingly, the friction elements are engaged in such a manner as to select the highest speed gear position in the low speed gear position group.

Thus, if the shift control means stops functioning normally while the vehicle is driven at a gear position in the low speed gear position group, the gear position is switched to and fixed at the highest speed gear position in the low speed gear position group.

While the vehicle is driven at a gear position in the high speed gear position group, the abnormality sensing means supplies the normal operation signal to the failsafe shift valve, which is shifted to the first shift position.

At this time, the high speed gear position selecting signal pressure supplies the high speed gear position selecting signal pressure to the high speed gear position storage cancel shift valve, which then supplies the original pressure of the high speed gear position storage signal pressure to the high speed gear position storage shift valve.

The high speed gear position storage shift valve is supplied with the high speed gear position selecting signal pressure from the high speed gear position selecting signal pressure generating means, and is also supplied with the original pressure of the high speed gear position storage signal pressure. Thus, the high speed gear position storage shift valve supplies the high speed gear position storage signal pressure to the failsafe shift valve. The failsafe shift valve, however, is supplied with the normal operation signal pressure from the abnormality sensing means, and thus, the shift position of the failsafe shift valve is fixed at the first shift position.

If, however, the shift control means stops functioning, the abnormality sensing means stops supplying the normal operation signal pressure. For this reason, the failsafe shift valve is not supplied with the normal operation signal pressure. On the other hand, the high speed gear position storage shift valve is supplied with the high speed gear position selecting signal pressure from the high speed gear position selecting signal pressure generating means, and is also supplied with the original pressure of the high speed gear position storage signal pressure. Therefore, the high speed gear position storage shift valve supplies the high speed gear position storage signal pressure to the failsafe shift valve. Thus, the failsafe shift valve is only supplied with the high speed gear position storage signal pressure, and is shifted to the second shift position.

When the failsafe shift valve is shifted to the second shift position, the friction elements are supplied with the signal pressure generated from the high speed gear position signal pressure generating means. Accordingly, the friction elements are engaged in such a manner as to select the highest speed gear position.

Therefore, if the shift control means stops functioning normally while the vehicle is driven at a gear position in the high speed gear position group, the gear position is switched to and fixed at the highest speed gear position.

When a gear position in the highest speed gear position group is switched to a gear position in the low speed gear position group, the high speed gear position storage cancel shift valve stops supplying the original pressure of the high speed gear position storage signal pressure, and cancels the self-maintaining state of the high speed gear position storage shift valve.

Therefore, when the gear position in the high speed gear position group is switched to the gear position in the low speed gear position group, the high speed gear position storage shift valve stops outputting the high speed gear position storage signal pressure.

In one preferred mode of the present invention, when the shift control means stops functioning, all outputs thereof carry no current, and the abnormality sensing means is a normal low type solenoid valve that supplies no signal pressure when no current is carried.

The use of the normal low type solenoid valve makes it possible to stop the supply of the normal operation signal pressure with a simple circuit structure when the shift control means stops functioning and all the outputs carry no current. This enables the reduction in the cost.

Alternatively, when the shift control means stops functioning, all outputs thereof carry no current; and the plurality of gear position selecting signal pressure generating means comprises normal high type solenoid valves, which supplies oil pressure in a state wherein no current is carried, and normal low type solenoid valves, which supply no signal pressure in a state wherein no current is carried; and the normal high type solenoid valves generate signal pressure to be supplied to the friction elements, which are engaged at the highest speed gear position in the low speed gear position group.

This enables the supply of the signal pressure to be supplied to the friction elements, which are engaged at the highest speed gear position in the low speed gear position group, with a simple circuit structure when the shift control means stops functioning and all the outputs carry no current. This enables the further reduction in the cost.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 2 is a table showing operational combinations of friction elements for changing gear positions;

FIG. 8 is a table showing the high-low state of solenoid valves at each gear position;

DETAILED DESCRIPTION OF THE PREFERRED EMBODIMENTS

Preferred embodiments of the present invention will be described hereinbelow.

This embodiment is applied to an automatic transmission that is capable of changing gear positions at six positions in forward driving and one position in backward driving.

Figure 1:
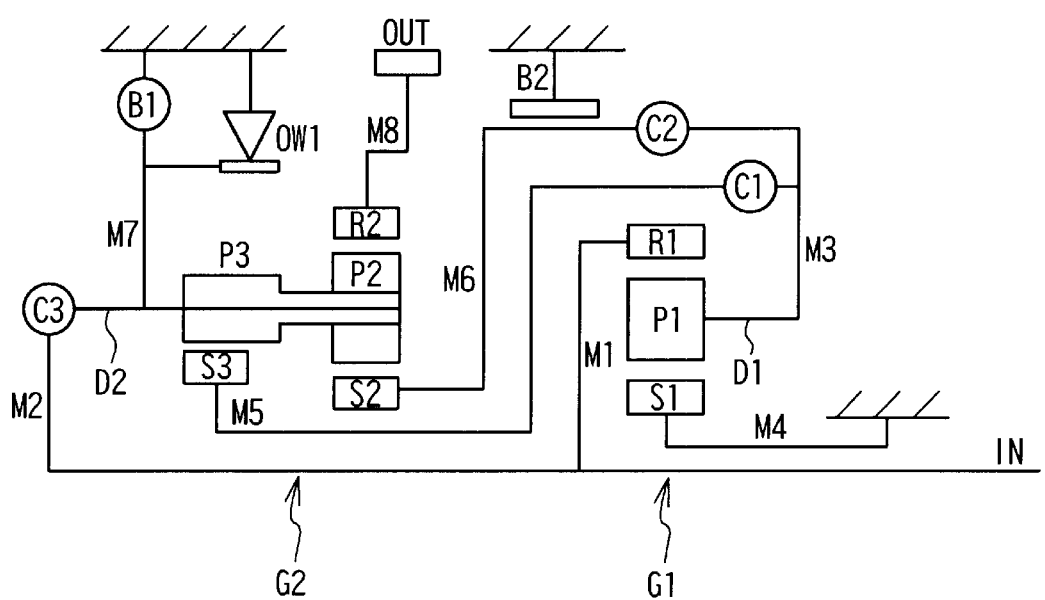
FIG. 1 is a schematic diagram showing a power transmission device of an automatic transmission according to a preferred embodiment of the present invention.

FIG. 1 is a schematic diagram showing a transmission mechanism according to the embodiment of the present invention. Along an axis of an input shaft IN supported in a transmission case, a first planetary gear mechanism G1 and a second planetary gear mechanism are arranged in that order from an input side connected to a torque converter. The members are arranged symmetrically with respect to the axis, and thus, the lower half of the axis is not illustrated in FIG. 1.

The first planetary gear mechanism G1 is a single pinion type, and the second planetary gear mechanism G2 is a ravineaux type. Both planetary gear mechanisms have well-known structures. The first planetary gear mechanism G1 comprises a sun gear S1, a first pinion P1, a first carrier D1 and a first ring gear R1. The first pinion P1, which is rotatably supported by the first carrier, is located between the first sun gear S1 and the first ring gear R1. The first pinion P1 is engaged with the first sun gear S1 and the first ring gear R1. The second planetary gear mechanism G2 comprises a second sun gear S2, a third sun gear S3, a second pinion P2, a third pinion P3, a second carrier D2 and a second ring gear R2.

The second pinion P2 and the third pinion P3 are rotatably supported by the second carrier D2. The second pinion P2 and the third pinion P3 are engaged with one another. The second pinion P2 is located between the second sun gear S2 and the second ring gear P2. The second pinion P2 is engaged with the second sun gear S2 and the second ring gear R2. The third pinion P3 is engaged with the third sun gear S3.

The input shaft IN is integrally connected to the first ring gear R1 of the first planetary gear mechanism G1 through a first rotary member M1. The input shaft IN is connectable to the second carrier D2 of the second planetary gear mechanism via a third clutch C3 through a second rotary member M2.

The first sun gear S1 of the first planetary gear mechanism G1 is fixed in the transmission case through a fourth member M4.

The first carrier D1 is connectable to the third sun gear S2 of the second planetary gear mechanism G2 via a third rotary member M3, a first clutch C1 and a fifth rotary member M5 in that order.

The second sun gear S2 of the second planetary gear mechanism G2 is connectable to the third rotary member M3 via a second clutch C2 through a sixth rotary member M6. The sixth rotary member M6 can be fixed to the transmission case through the second brake B2.

A seventh rotary member M7 is integrally connected to the second carrier D2 of the second planetary gear mechanism G2. The seventh rotary member M7 can be fixed to the transmission case through a first brake B1 and a one-way clutch OW1 arranged in parallel. With a rotational input in a reverse direction to the rotating direction of the input shaft IN, the one-way clutch OW1 is engaged, i.e., fixes the seventh rotary member M7.

An output gear OUT is integrally connected to the second ring gear R2 of the second planetary gear mechanism G2 through an eighth rotary member M8.

In the above structure, the engagement of two elements among the first through third clutches C1–C3; the first and second brakes B1, B2; and the one-way clutch OW1 achieves six gear positions in forward driving and one gear position (Rev.) in backward driving as shown in FIG. 2. In FIG. 2, circles indicate the engaged friction elements.

An outline of the transmission operation will now be given hereinbelow.

Figure 3A:
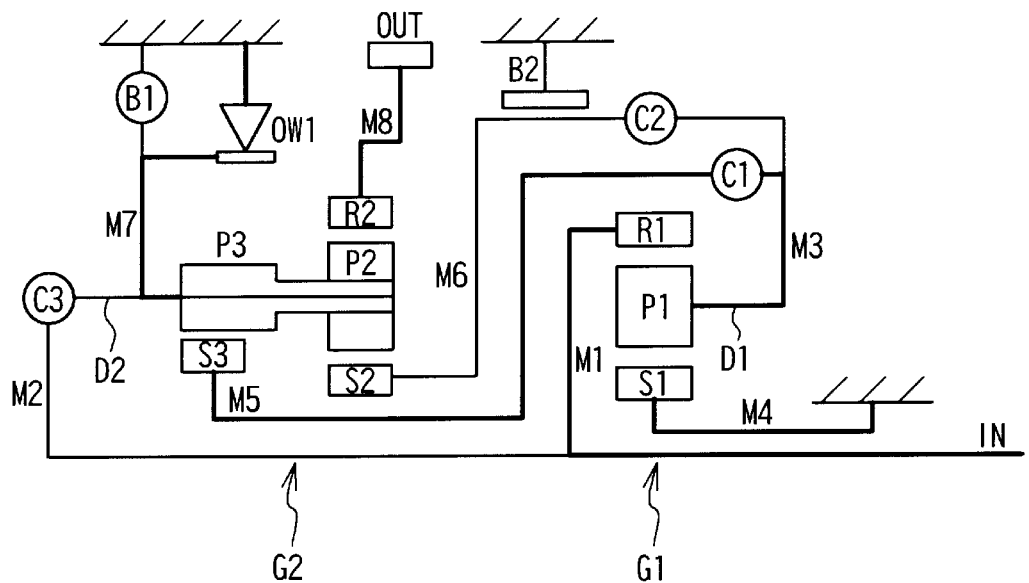
FIG. 3A is a view showing the transmission state of a power transmission device in the case where a forward driving first speed gear position is selected.

For a selection of the first speed gear position in forward driving, the first clutch C1 is engaged as shown in FIG. 3A. In FIG. 3A, the operating friction elements and rotary members are indicated by thick solid lines. This applies to the other drawings.

The rotation of the input shaft IN inputted to the first ring gear R1 of the first planetary gear mechanism G1 via the first rotary member M1 is reduced and outputted to the first carrier D1, and the rotation is transmitted to the third sun gear S3 of the second planetary gear mechanism G2 via the first clutch (and the third and fifth rotary members M3 and M5).

The one-way clutch OW1 prevents the reverse rotation of the second carrier D2 of the second planetary gear mechanism G2 through the seventh rotary member M7, and thus, the second planetary gear mechanism G2 reduces the speed of the second ring gear R2 with respect to the rotation of the third sun gear S3. This achieves the first speed at the output gear OUT integrated with the second ring gear R2.

Figure 3B:
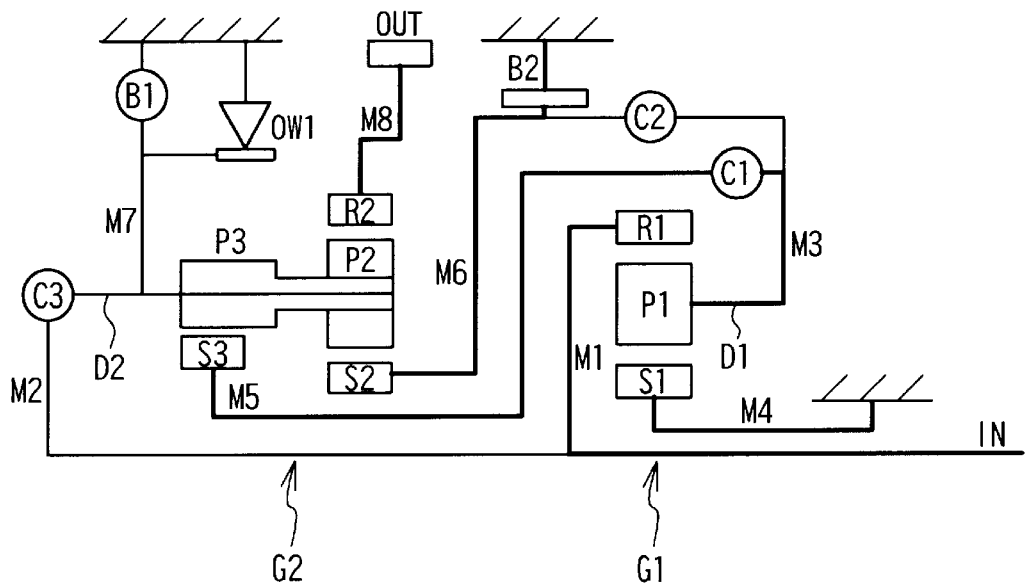
FIG. 3B is a view showing the transmission state of a power transmission device in the case where a forward driving second speed position is selected.

For a selection of the second speed gear position in forward driving, the second brake B2 is additionally engaged in the state of the first speed gear position as shown in FIG. 3B. Therefore, the rotation of the input shaft IN is transmitted to the third sun gear S3 of the second planetary gear mechanism G2 as is the case with the first speed gear position, and the engagement of the second brake B2 fixes the second sun gear S2 through the sixth rotary member M6. The second pinion P2 is rolling on the fixed second sun gear S2. This achieves the second speed, which is higher than the first speed, at the output gear OUT integrated with the second ring gear R2.

Figure 4A:
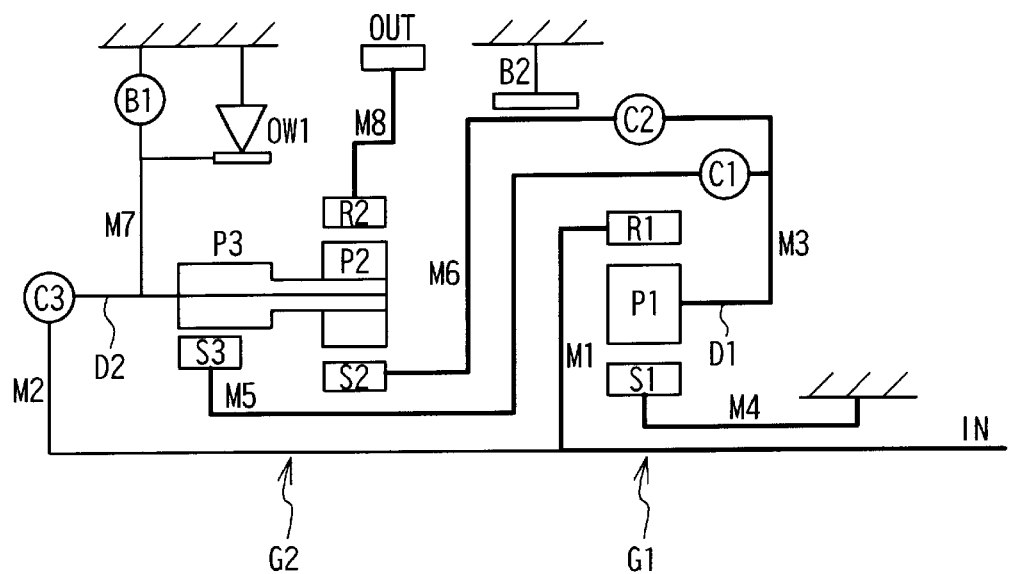
FIG. 4A is a view showing the transmission state of a power transmission device in the case where a forward driving third speed gear position is selected.

For a selection of the third speed gear position in forward driving, the second brake B2 is disengaged in the state of the second speed gear position, and the second clutch C2 is engaged as shown in FIG. 4A. The fifth rotary member M5, the sixth rotary member M6 are connected to the third rotary member M3 via the first clutch C1 and the second clutch C2, respectively. In the second planetary gear mechanism G2, the second sun gear S2 and the third sun gear S3 are rotated integrally with each other.

This locks the second pinion P2 and the third pinion P3, and achieves the third speed at which the output gear OUT integrated with the second ring gear R2 rotates at the same speed as the first carrier (the second sun gear S2 and the third sun gear S3) of the first planetary gear mechanism G1.

Figure 4B:
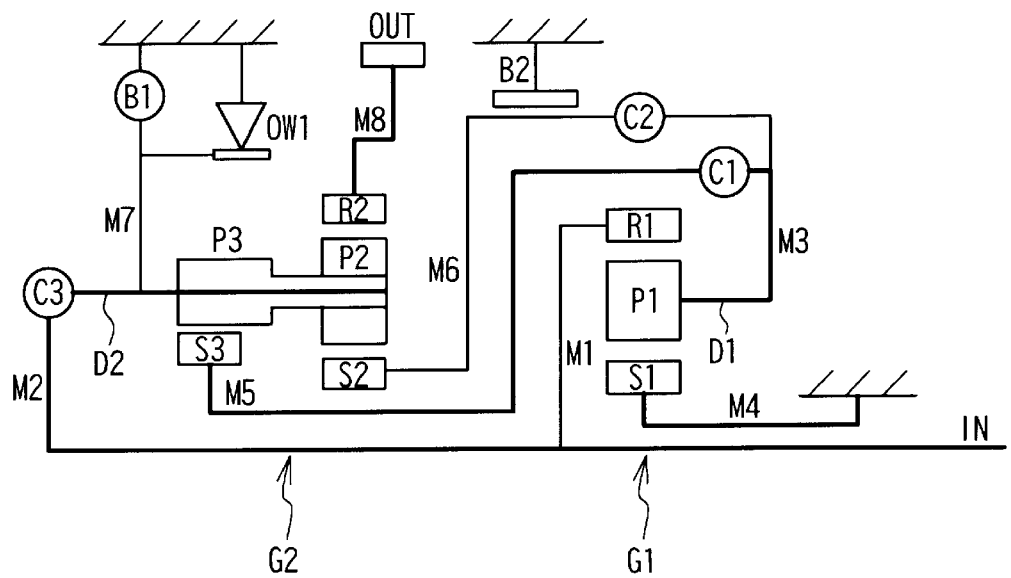
FIG. 4B is a view showing the transmission state of a power transmission device in the case where a forward driving fourth speed gear position is selected.

For a selection of the fourth speed gear position in forward driving, the second clutch C2 is disengaged in the state of the third speed gear position, and the third clutch C3 is engaged as shown in FIG. 4B. Therefore, the second carrier D2 of the second planetary gear mechanism G2 is rotated in the same direction as the input shaft IN through the second rotary member M2 whereas the speed of the third sun gear S3 of the second planetary gear mechanism G2 is reduced with respect to the rotation of the input shaft via the first planetary gear mechanism G1.

Thus, the rotating direction of the second pinion P2 is in a direction to force the second ring gear R2 in a reverse direction, and the second ring gear R2 is rotated at a higher speed than the third sun gear S3. This achieves the fourth speed at the output gear OUT, which is higher than the rotating speed of the first carrier D1 of the first planetary gear mechanism G1.

Figure 5A:
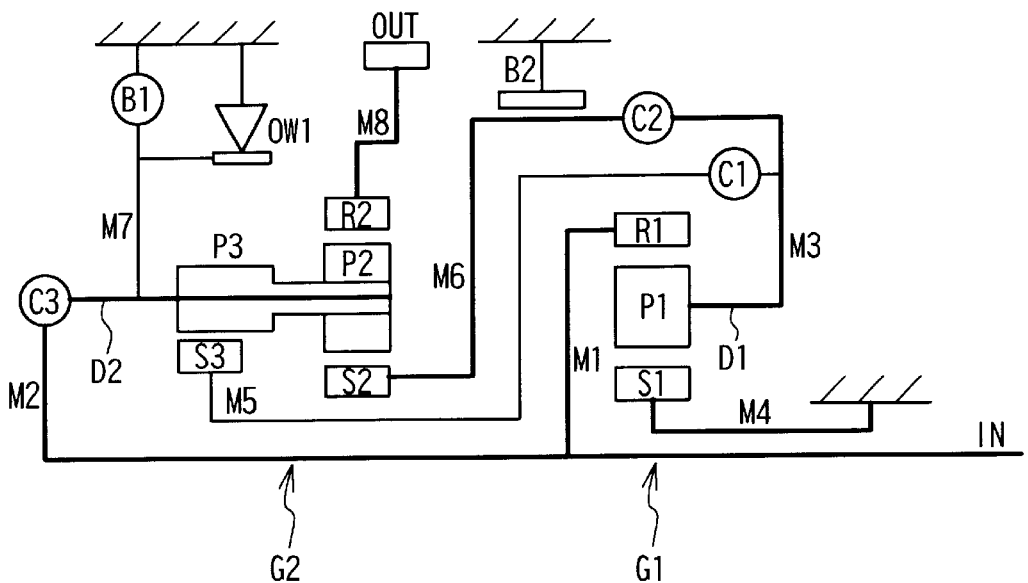
FIG. 5A is a view showing the transmission state of a power transmission device in the case where a forward driving fifth speed gear position is selected.

For a selection of the fifth speed gear position in forward driving, the first clutch C1 is disengaged in the state of the fourth speed gear position, and the second clutch C2 is engaged as shown in FIG. 5A. The second carrier D2 of the second planetary gear mechanism G2 is rotated at the same speed as the input shaft IN while the rotation of the first carrier D1, the rotation speed of which is reduced with respect to the rotation of the input shaft in the first planetary gear mechanism G1, is transmitted to the second sun gear S2 of the second planetary gear mechanism G2 through the second clutch C2. Consequently, the second pinion P2, which is rolling on the second sun gear S2 in the same direction as the second sun gear S2 in the second planetary gear mechanism G2, rotates in such a direction as to increase the speed of the second ring gear R2, and this achieves the fifth speed at the output gear OUT, which is higher than the fourth speed.

Figure 5B:
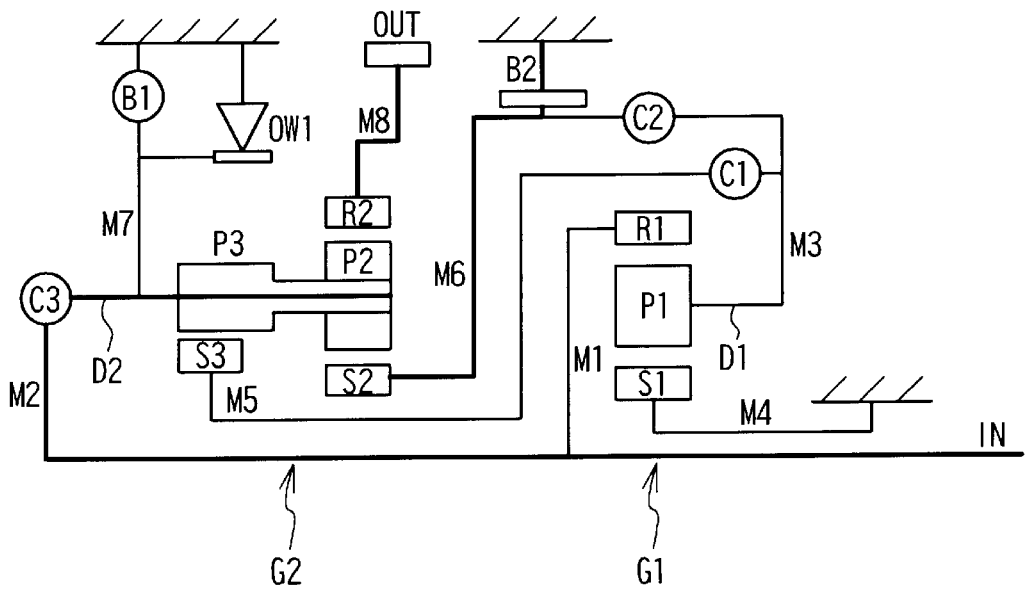
FIG. 5B is a view showing the transmission state of a power transmission device in the case where a forward driving sixth speed gear position is selected.

For a selection of the sixth speed gear position in forward driving, the second clutch C2 is disengaged in the state of the fifth speed gear position, and the second brake B2 is engaged as shown in FIG. 5B. In this case, the second brake B2 fixes the second sun gear S2 whereas the second carrier D2 of the second planetary gear mechanism G2 is rotated at the same speed as the input shaft IN. Therefore, the second pinion P2 on the second carrier D2 is rotated at a higher speed than the fifth speed. This achieves the sixth speed at the output gear OUT integrated with the second ring gear R2, and the sixth speed is higher than the fifth speed.

Figure 6:
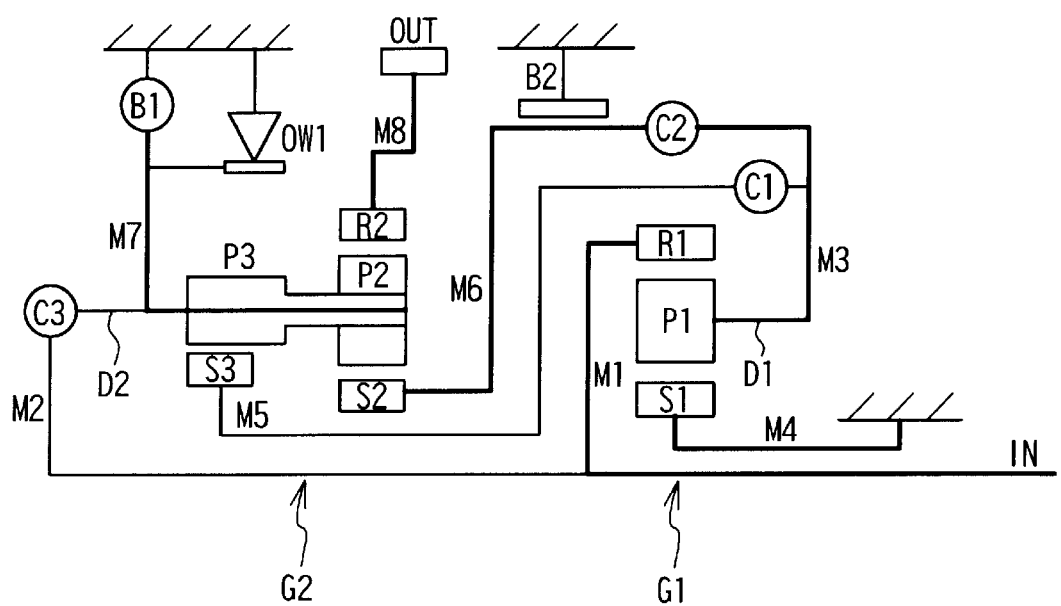
FIG. 6 is a view showing the transmission state of a power transmission device in the case where a backward driving gear position is selected.

For a selection of the gear position in backward driving, the second clutch C2 and the first brake B1 are engaged as shown in FIG. 6. The rotation of the first carrier D1, the rotation speed of which is reduced with respect to the rotation of the input shaft in the first planetary gear mechanism G1, is transmitted to the second sun gear S2 of the second planetary gear mechanism G2 via the second clutch C2. On the other hand, the second carrier D2 supporting the second pinion P2 is fixed by the first brake B1 through the seventh rotary member M7. Consequently, the ring gear R2 of the second planetary gear mechanism G2 is rotated in a reverse direction with respect to the second sun gear S2. This achieves the gear speed in backward driving at the output gear OUT. The gear ratios of the sun gears, the ring gears and the like in the planetary gear mechanisms are determined so that gear ratios of the gear positions can be allocated in the optimum way according to the characteristics of the vehicle and the like.

Figure 7:
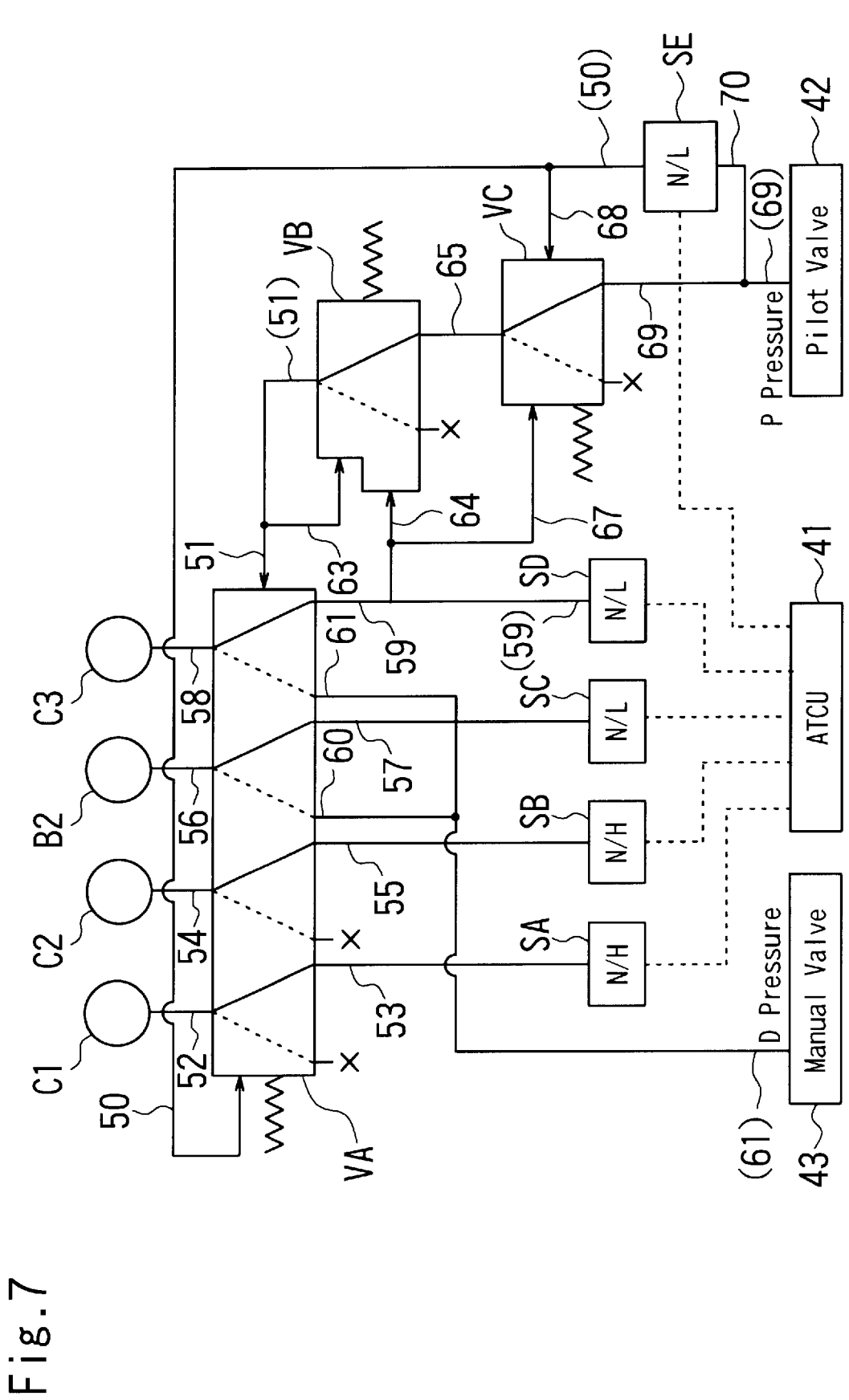
FIG. 7 is a view showing an oil pressure control circuit according to a preferred embodiment.

FIG. 7 shows a part of an oil pressure control circuit of the power transmission device, which is directly related to the present invention. The oil pressure control circuit of the present embodiment comprises an ATCU 41; four solenoid valves SA, SB, SC, SD for switching the gear positions in normal operation, an abnormality sensing solenoid valve SE for sensing the operating state of the ATCU 41; a failsafe shift valve VA for failsafe operation; a high speed gear position storage shift valve VB and a high speed gear position storage cancel shift valve VC for sensing whether the vehicle is driven at the first, second or third speed gear position belonging to a low speed gear position group or at the fourth, fifth or sixth speed gear position belonging to a high speed gear position group during the failsafe operation; a pilot valve 42 that supplies a pilot pressure (hereinafter referred to as a P pressure); and a manual valve 43 that supplies a drive pressure (hereinafter referred to as a D pressure) when the forward driving gear position is selected.

The control circuit is a direct driven oil pressure control circuit whose ATCU 41 calculates the gear position suitable for the driving conditions, and changes the gear positions by controlling the high-low state of the solenoid valves that supply and release an oil pressure as a signal pressure controlling the engagement and disengagement of the friction elements.

Normally, the gear positions are changed under the control of the ATCU 41 in such a manner that the high-low state of the following solenoid valves according to the selected gear position as shown in FIG. 8: the solenoid valve SA that controls the engagement and disengagement of the first clutch C1, the solenoid valve SB that controls the engagement and disengagement of the second clutch C2, the solenoid valve SC that controls the engagement and disengagement of the second brake B2, and the solenoid valve SD that controls the engagement and disengagement of the third clutch C3. The oil pressure outputted from each solenoid valve is controlled to be a proper pressure by an oil pressure control function of each solenoid valve.

First, there will be described the connecting state of oil channels in each shift valve.

Each shift valve is switched by supplying and releasing the oil pressure applied to a valve end face, and changes the connecting state of the oil channels. A spring force and an oil pressure supplied through an oil channel 50 are applied to an end face of the failsafe shift valve VA in a direction to force it to the right in FIG. 7. The oil pressure supplied through the oil channel 51 is applied to the failsafe shift valve VA to force it to the left in FIG. 7. The spring force is predetermined in such a manner as to satisfy the following condition:

the oil pressure of the oil channel 51>the spring force

Although described later in detail, the oil pressure supplied to the oil channels 50 and 51 is the same P pressure.

If the oil pressure is not supplied to the oil channel 51, the failsafe shift valve VA is shifted to the right and is brought into a first shift position whether the oil pressure is supplied to the oil channel 50 or not. If the oil pressure is supplied to the oil channel 50 in the case where the oil pressure is supplied to the oil channel 51, the oil pressure of the oil channel 51 and the oil pressure of the oil channel 50 offset each other. Thus, the spring force shifts the failsafe shift valve VA to the right so that the failsafe shift valve can be brought into the first shift position.

If the oil pressure is supplied to the oil channel 51 and is not supplied to the oil channel 50, the failsafe shift valve VA is shifted to the left and is brought into a second shift position.

In the first shift position, the upper and lower channels of the failsafe shift valve VA communicate with one another as indicated by solid lines in FIG. 7. More specifically, an oil channel 52 connects with an oil channel 53, an oil channel 54 connects with an oil channel 55, an oil channel 56 connects with an oil channel 57, and an oil channel 58 connects with an oil channel 59.

In the second shift position where the failsafe shift valve VA is shifted to the left, the upper and lower channels of the failsafe shift valve VA communicate with one another as indicated by broken lines. More specifically, the oil channel 52 and the oil channel 54 are drained through drain ports (indicated by marks×in FIG. 7), the oil channel 56 connects with an oil channel 60, and the oil channel 58 connects with an oil channel 61.

The oil channel 52 connects with the first clutch C1, the oil channel 54 connects with the second clutch C2, the oil channel 56 connects with the second brake B2, and the oil channel 58 connects with the third clutch C3. The oil channel 53 connects with the solenoid valve SA, the oil channel 55 connects with the solenoid valve SB, the oil channel 57 connects with the solenoid valve SC, and the oil channel 59 connects with the solenoid valve SD. The oil channels 60 and 61 are supplied with the D pressure from a manual valve 43. An oil pressure supplied through oil channels 63 and 64 is applied to an end face of the high speed gear position storage shift valve VB to force it to the right in FIG. 7. A spring force is applied to the end face of the high speed gear position storage shift valve VB to force it to the left in FIG. 7. The oil pressure and the spring force applied to the high speed gear position storage shift valve VB are predetermined in such a manner as to satisfy the following conditions:

the oil pressure of the oil channel 63>the spring force and the oil pressure of the oil channel 64>the spring force Therefore, if the oil pressure is supplied to the oil channel 63 or the oil channel 64, the high speed gear position storage shift valve VB is shifted to the right in FIG. 7. If no oil pressure is supplied to the oil channel 63 and the oil channel 64, the spring force shifts the high speed gear position storage shift valve VB to the left in FIG. 7. If the high speed gear position storage shift valve VB is shifted to the right, the oil channel 51 connects with an oil channel 65 as indicated by a solid line in FIG. 7. If the high speed gear position storage shift valve VB is shifted to the left, the oil channel 51 is drained as indicated by broken lines.

A spring force and an oil pressure supplied through an oil channel 67 is applied to the high speed gear position storage cancel shift valve VC to force it to the right in FIG. 7. An oil pressure supplied through an oil channel 68 is applied to the high speed gear position storage cancel shift valve VC to force it to the left. The oil pressure and the spring force applied to the high speed gear position storage cancel shift valve VC are predetermined in such a manner as to satisfy the following conditions:

the oil pressure of the oil channel 67+the spring force >the oil pressure of the oil channel 68 and the oil pressure of the oil channel 68>the spring force Therefore, if no oil pressure is supplied to the oil channel 68, the spring force shifts the high speed gear position storage cancel shift valve VC to the right whether the oil pressure is supplied to the oil channel 67 or not. Even if the oil pressure is supplied to the oil channel 68, the high speed gear position storage cancel shift valve VC is shifted to the right in the case where the oil pressure is supplied to the oil channel 67.

If the oil pressure is supplied to the oil channel 68 and is not supplied to the oil channel 67, the high speed gear position storage cancel shift valve VC is shifted to the left. If the high speed gear position storage cancel shift valve VC is shifted to the right, the oil channel 65 connects with an oil channel 69 as indicated by a solid line in FIG. 7. If the high speed gear position storage cancel shift valve VC is shifted to the left, the oil channel 65 is drained as indicated by broken lines. The oil channel 69 is connected to the pilot valve 42.

The solenoid valve SA, the solenoid valve SB, the solenoid valve SC and the solenoid valve SD are supplied with line pressure as original pressure generated by an oil pump and a pressure regulator (not shown). The solenoid valve SA, the solenoid valve SB, the solenoid valve SC and the solenoid valve SD supplies and releases the oil pressure under the control of the ATCU 41. The solenoid valve SA and the solenoid valve SB are normal high (N/H) type solenoid valves. They supply the line pressure when no current is supplied, and they stop the supply of the line pressure when the current is supplied thereto. The solenoid valve SC and the solenoid valve SD are normal low (N/L) type solenoid valves. They supply the line pressure when the current is supplied, and they stop the supply of the line pressure when the no current is supplied thereto.

The abnormality sensing solenoid valve SE is a normal low type solenoid valve that is supplied with P pressure as original pressure from the pilot valve 42 through the oil channel 69 and an oil channel 70. The abnormality sensing solenoid valve SE supplies the P pressure to the oil channel 50 when the current is supplied by the ATCU 41 and stops the supply of the P pressure. The ATCU 41 selects a proper gear position according to information about driving ranges selected by a driver and the driving conditions, and controls the current-supply state of the solenoid valve SA, the solenoid valve SB, the solenoid valve SC and the solenoid valve SD. If a forward driving gear position is selected, the ATCU 41 keeps the abnormality sensing solenoid valve SE always supplied with the current.

The pilot valve 42 is supplied with line pressure as original pressure, and supplies P pressure having predetermined oil pressure to the oil channel 69 and the oil channel 70. Since the original pressure is the line pressure, the supply of the P pressure to the oil channel 69 is stopped if the engine is stopped. If the driver selects a forward driving range, the manual valve 43 supplies D pressure.

The failsafe shift valve VA, the high speed gear position storage shift valve VB and the abnormality sensing solenoid valve SE constitute low speed gear position failsafe means and high speed gear position failsafe means of the present invention. Particularly, the failsafe shift valve VB corresponds to a failsafe valve of the present invention, the high speed gear position storage shift valve VB corresponds to a high speed gear position storage valve, and the high speed gear position storage cancel shift valve VC corresponds to a high speed gear position storage cancel valve. The ATCU 41 corresponds to shift control means of the present invention, and the abnormality sensing solenoid valve SE corresponds to abnormality sensing means.

The solenoid valve SA, the solenoid valve SB, the solenoid valve SC and the solenoid valve SD constitute gear position selecting signal pressure generating means of the present invention. Particularly, the solenoid valve SD also corresponds to high speed gear position selecting signal pressure generating means of the present invention. The manual valve 43 corresponds to high speed gear position signal pressure generating means.

Figure 9:
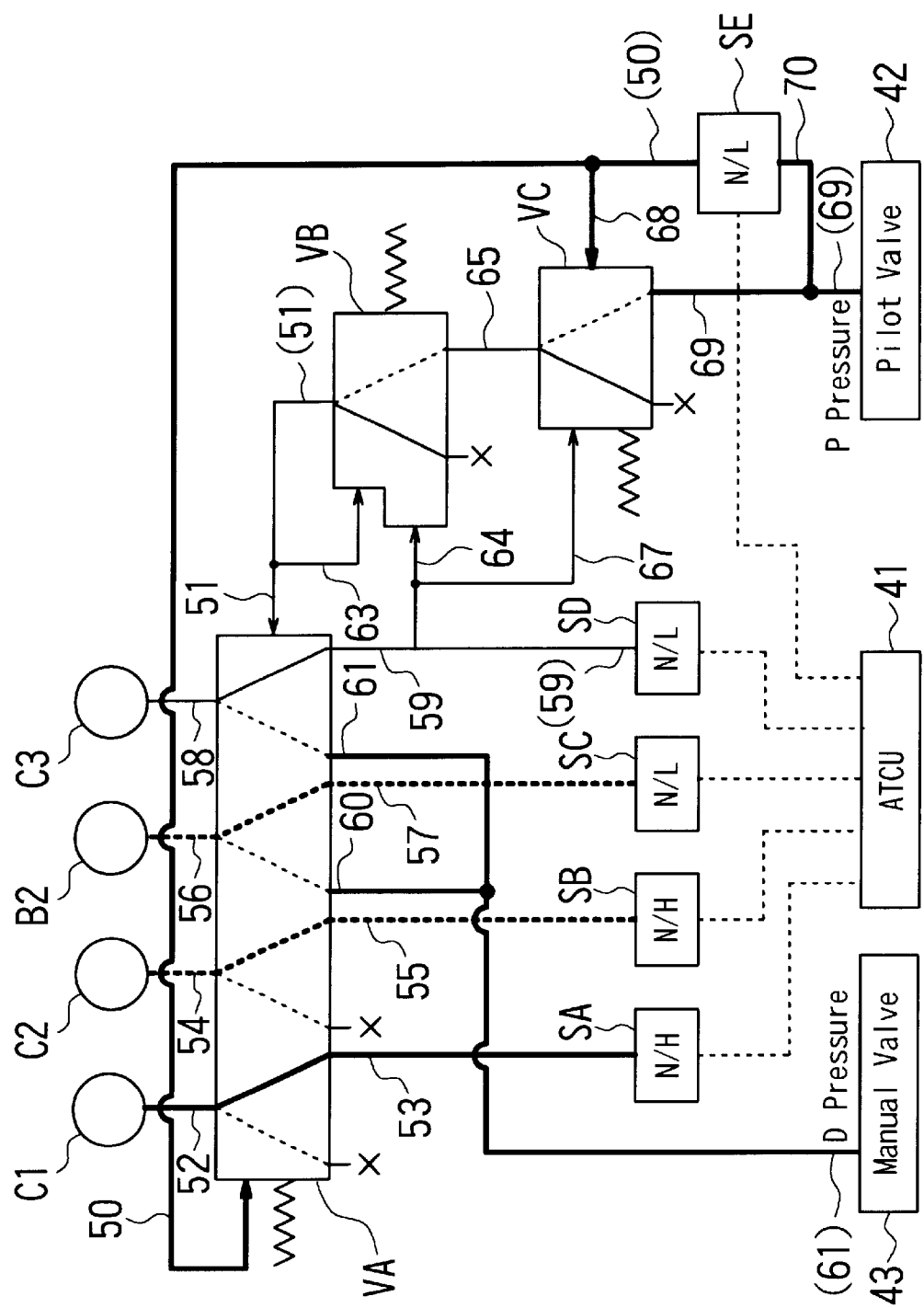
FIG. 9 is a view showing the supplied state of an oil pressure while a vehicle is driven at a low speed gear position.

There will now be described the supplied state of oil pressure in the case where the control is performed normally. FIG. 9 shows the supplied state of oil pressure in the case where the first, second or third speed gear position is selected. Since it is necessary to engage only the first clutch C1 at the first speed gear position as shown in FIG. 2, the solenoid valve SA, which is the normal-high type solenoid valve, is supplied with no current under the control of the ATCU 41, and supplies the oil pressure to the oil channel 53. The solenoid valve SB, which is also the normal-high type solenoid valve, is supplied with the current and supplies no oil pressure to the oil channel 55. The solenoid valves SC and the solenoid valves SD, which are the normal-low type solenoid valve, is supplied with no current under the control of the ATCU 41, and supplies no oil pressure to the oil channel 57 and the oil channel 59.

Since it is necessary to engage the first clutch C1 and the second brake B2 at the second speed gear position, the solenoid valve SA is supplied with no current and supplies the oil pressure to the oil channel 53 and the solenoid valve SC is supplied with the current and supplies the oil pressure to the oil channel 57 under the control of the ATCU 41. The solenoid valve SB is supplied with the current and supplies no oil pressure to the oil channel 55 and the solenoid valve SD is supplied with no current and supplies no oil pressure to the oil channel 59 under the control of the ATCU 41.

Since it is necessary to engage the first clutch C1 and the second clutch C2 at the third speed gear position, the solenoid valve SA and the solenoid valve SB are supplied with no current and supplies the oil pressure to the oil channel 53 and the oil channel 55, respectively under the control of the ATCU 41. The solenoid valve SC and the solenoid valve SD are supplied with no current, and supplies no oil pressure to the oil channel 57 and the oil channel 59 under the control of the ATCU 41.

The pilot valve 42 supplies the P pressure to the oil channel 69 and the oil channel 70. If the ATCU 41 functions normally, the abnormality sensing solenoid valve SE as the normal low type solenoid valve is supplied with the current, and thus, the P pressure is supplied to the oil channel 50 and the oil channel 68.

At the first, second or third speed gear position as the low speed gear position, the solenoid valve SD as the normal low type solenoid valve is supplied with no current, and no oil pressure is supplied to the oil channel 64 and the oil channel 67. Therefore, with respect to the high speed gear position storage cancel shift valve VC, no oil pressure is supplied to the oil channel 67 and the oil pressure is supplied to the oil channel 68. As a result, the high speed gear position storage cancel shift valve VC is shifted to the left, and the oil channel 65 is drained.

Since no oil pressure is supplied to the oil channel 64 and the oil channel 63, the high speed gear position storage shift valve VB shifts to the left and the oil channel 51 is drained. Therefore, no oil pressure is supplied to the oil channel 51 of the failsafe shift valve VA, and the failsafe shift valve VA is shifted to the right to the first shift position. The oil channel 52 connects with the oil channel 53, the oil channel 54 connects with the oil channel 55, the oil channel 56 connects with the oil channel 57, and the oil channel 58 connects with the oil channel 59. The solenoid valve SA, the solenoid valve SB, the solenoid valve SC and the solenoid valve SD connect with the first clutch C1, the second clutch C2, the second brake B2 and the third clutch C3, respectively.

Figure 10:
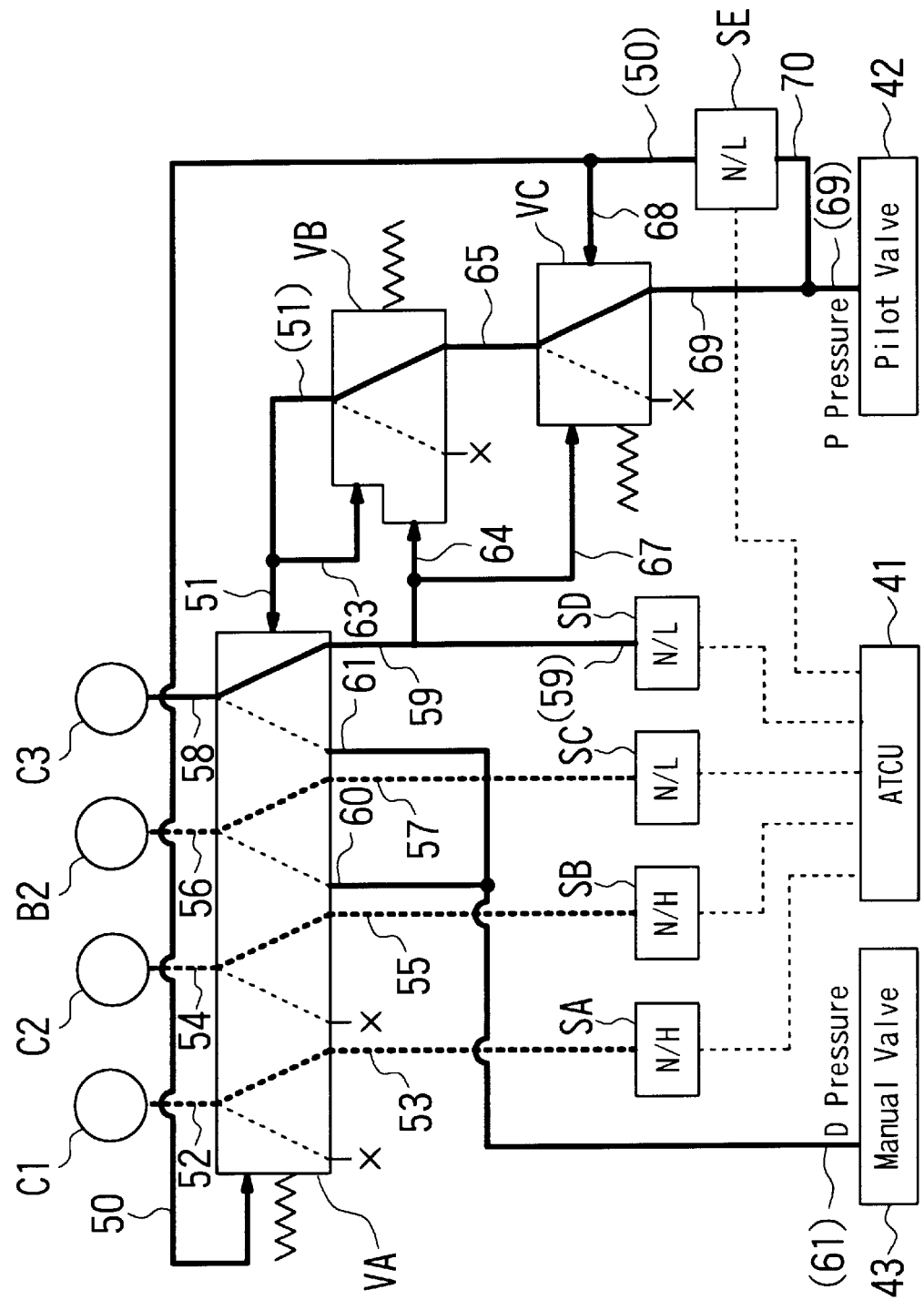
FIG. 10 is a view showing the supplied state of oil pressure while a vehicle is driven at a high speed gear position.

FIG. 10 shows the supplied state of oil pressure in the case where the fourth, fifth or sixth speed gear position is selected. Since it is only necessary to engage the first clutch C1 and the third clutch C3 at the fourth speed gear position as shown in FIG. 2, under the control of the ATCU 41 the solenoid valve SA is supplied with no current and the solenoid valve SD is supplied with the current so that the oil pressure is supplied to the oil channel 53 and the oil channel 59. The solenoid valve SB is supplied with the current and the solenoid valve SC is supplied with no current, and no oil pressure is supplied to the oil channel 55 and the oil channel 57.

Since it is only necessary to engage the second clutch C2 and the third clutch C3 at the fifth speed gear position, the solenoid valve SB is supplied with no current and the solenoid valve SD is supplied with the current under the control of the ATCU 41. Thus, the oil pressure is supplied to the oil channel 55 and the oil channel 59. The solenoid valve SA is supplied with the current, and the solenoid valve SC is supplied with no current. Thus, no oil pressure is supplied to the oil channel 53 and the oil channel 57.

Since it is only necessary to engage the second brake B2 and the third clutch C3 at the sixth speed gear position, the solenoid valve SC and the solenoid valve SD are supplied with the current under the control of the ATCU 41, and supply the oil pressure to the oil channel 57 and the oil channel 59. The solenoid vale SA and the solenoid valve SB are supplied with the current, and no oil pressure is supplied to the oil channel 53 and the oil channel 55.

If the ATCU 41 functions normally, the abnormality sensing solenoid valve SE is supplied with the current, and the P pressure is supplied to the oil channel 50 and the oil channel 68. If the fourth, fifth or sixth speed gear position is selected, the solenoid valve SD as the normal low type solenoid valve is supplied with the current. Thus, the oil pressure is supplied to the oil channel 64 and the oil channel 67. Therefore, the oil pressure is supplied to the oil channel 67 and the oil channel 68, and the high speed gear position storage cancel shift valve VC is shifted to the right. Thus, the oil channel 65 connects with the oil channel 69, and the P pressure is supplied to the oil channel 65.

With respect to the high speed gear position storage shift valve VB, since the oil pressure is supplied to the oil channel 64, the high speed gear position storage shift valve VB is shifted to the right. Thus, the oil channel 51 connects with the oil channel 65, and the P pressure is supplied to the oil channel 51. The P pressure is also supplied to the oil channel 63 from the oil channel 51 to fix the shift position of the high speed gear position storage shift valve VB so that a failsafe operation is performed when the ATCU 41 stops its normal function.

The pilot pressure is supplied to the oil channel 51 with respect to the failsafe shift valve VA, and the pilot pressure is also supplied to the oil channel 50. This cancels the operation of the oil pressure, and therefore the spring force shifts the failsafe valve VA to the right. The solenoid valve SA, the solenoid valve SB, the solenoid valve SC and the solenoid valve SD are connected to the first clutch C1, the second clutch C2, the second brake B2 and the third clutch C2, respectively.

There will now be described the supplied state of oil pressure when the failsafe operation is performed in the case where the ATCU 41 goes wrong and stops functioning.

Figure 11:
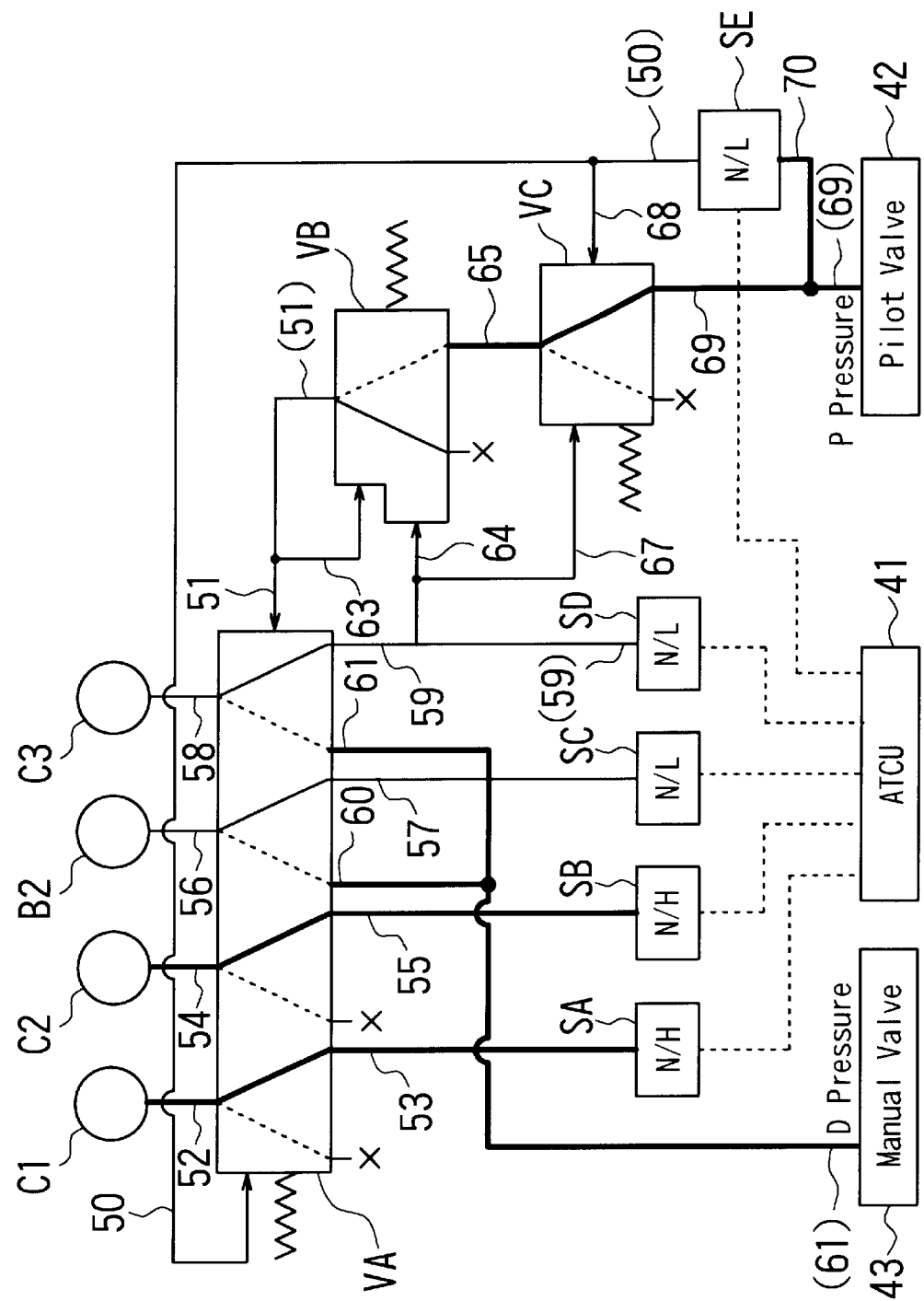
FIG. 11 is a view showing the supplied state of oil pressure when an ATCU function is stopped at a low speed gear position.

FIG. 11 shows the supplied state of oil pressure in the case where the ATCU 41 stops functioning while the first, second or third speed gear position as the low speed gear position is selected. If the ATCU 41 stops functioning; the solenoid valve SA, the solenoid valve SB, the solenoid valve SC and the solenoid valve SD, which are originally controlled to be in the high or low state according to whether the current is supplied from the ATCU 41, are all fixed in the non-current state.

Therefore, the solenoid valve SA and the solenoid valve SB as the normal high type solenoid valves are brought into the high state in the non-current state, and supply the oil pressure to the oil channel 53 and the oil channel 55. The solenoid valve SC and the solenoid valve SD as the normal low type solenoid valves are brought into the low state in the non-current state, and supply no oil pressure to the oil channel 57 and the oil channel 59.

Since the engine is running, the P pressure is supplied from the pilot valve 42 to the oil channel 69 and the oil channel 70. When the ATCU 41 stops functioning, however, the abnormality sensing solenoid valve SE as the normal low type solenoid valve is brought into the non-current state and the abnormality sensing solenoid valve SE is fixed in the low state. Thus, no P pressure is supplied to the oil channel 50 and the oil channel 68.

Accordingly, with respect to the high speed gear position storage cancel shift valve VC, no oil pressure is supplied to the oil channel 67 and the oil channel 68, and thus, the high speed gear position storage cancel shift valve VC is shifted to the right. The oil channel 65 connects with the oil channel 69, and the P pressure is supplied to the oil channel 65.

With respect to the high speed gear position storage shift valve VB, since no oil pressure is supplied to the oil channel 64 and the oil channel 63, the high speed gear position storage shift valve VB is shifted to the left and the oil channel 51 is drained.

With respect to the failsafe shift valve VA, since no oil pressure is supplied to the oil channel 51, the failsafe shift valve VA is shifted to the right to the first shift position. The solenoid valve SA, the solenoid valve SB, the solenoid valve SC and the solenoid valve SD connect with the first clutch C1, the second clutch C2, the second brake B2 and the third clutch C3, respectively.

The oil pressure is supplied to the oil channel 53 and the oil channel 55 at this time, and thus, the first clutch C1 and the second clutch C2 are engaged, and the state of the third speed gear position in the normal operation is obtained. Therefore, if the ATCU 41 stops functioning while the vehicle is driven at the first, second or third speed gear position, the gear position is fixed at the third speed.

Figure 12:
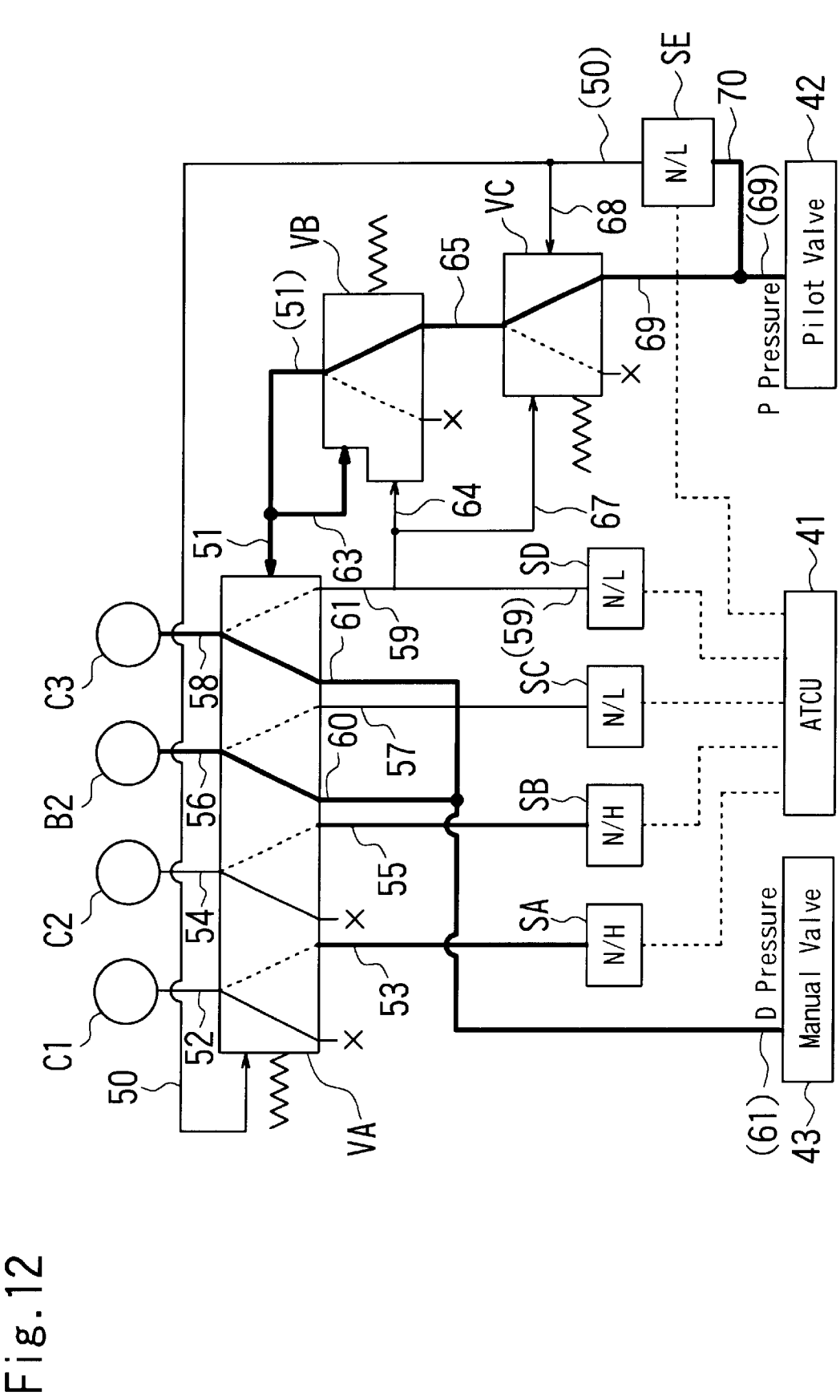
FIG. 12 is a view showing the supplied state of oil pressure when an ATCU function is stopped at a high speed gear position.

FIG. 12 shows the supplied state of oil pressure when the ATCU 41 stops functioning in the case where the fourth, fifth or sixth speed as the high speed gear position is selected. As is the case where the low speed gear position is selected, the solenoid valve SA, the solenoid valve SB, the solenoid valve SC and the solenoid valve SD are all fixed in the non-current state. The oil pressure is supplied to the oil channel 53 and the oil channel 55, whereas no oil pressure is supplied to the oil channel 57 and the oil channel 59. The abnormality sensing solenoid valve SE is brought into the non-current state, and no P pressure is supplied to the oil channel 50 and the oil channel 68.

Accordingly, with respect to the high speed gear position storage cancel shift valve VC, no oil pressure is supplied to the oil channel 67 and the oil channel 68, so that the high speed gear position storage cancel shift valve VC is shifted to the right. The oil channel 65 connects with the oil channel 69, and the P pressure is supplied to the oil channel 65.

If the low gear position were selected when the ATCU 41 was normally functioning, the high speed gear position storage cancel shift valve shifted to the left would be shifted to the right. However, since the high speed gear position is actually selected when the ATCU 41 functions normally, the high speed gear position storage cancel shift valve VC shifted to the right as shown in FIG. 10 is unchanged while the ATCU 41 does not function.

Therefore, the P pressure is continuously supplied to the oil channel 51 even if the ATCU 41 stops functioning. The oil pressure is continuously supplied to the oil channel 63 of the high speed gear position storage shift valve VB. More specifically, since the shift position of the high speed gear position storage cancel shift valve VC is fixed at the right side, the supply of the P pressure, which is applied to the high speed gear position storage shift valve VB from the oil channel 63 through the oil channel 51 as shown in FIG. 10 while the ATCU 41 functions normally, is never stopped even if the ATCU 41 stops functioning. Therefore, the high speed gear position storage shift valve VB is fixed at the right side.

Accordingly, no oil pressure is supplied to the oil channel 50 of the failsafe shift valve VA and the oil pressure is supplied to the oil channel 51, and thus, the failsafe shift valve VA is shifted to the left to the second shift position. At this time, the oil channel 52 and the oil channel 54 are drained, the oil channel 56 connects with the oil channel 60, and the oil channel 58 connects with the oil channel 61. Since the D pressure is supplied to the oil channel 60 and the oil channel 61 from the manual valve 42, the second brake B2 and the third clutch C3 are engaged, and the state of the sixth speed gear position in the normal operation is obtained. Therefore, if the ATCU 41 stops functioning while the vehicle is driven at the fourth, fifth or sixth speed gear position, the gear position is fixed at the sixth speed.

If the supply of the P pressure is stopped, i.e., if the engine is stopped once to stop the supply of the line pressure supplied by the pilot valve 42, the oil pressure is supplied as shown in FIG. 11 when the engine is started again. Consequently, the gear position is fixed at the third speed, and the vehicle is started easily. If the gear position is shifted from the forth speed down to the third speed, no oil pressure is supplied to the high speed gear position storage cancel shift valve VC from the oil channel 67. Thus, the shift position of the high speed gear position storage cancel shift valve VC is shifted from the right side to the left side, and the supply of the P pressure to the oil channel 65 is stopped. The shift position of the high speed gear position storage shift valve VB is never fixed, and the normal operation is ensured.

Therefore, if the ATCU 41 stops functioning while the vehicle is driven at the first, second or third speed gear position, the gear position is switched to the third speed. If the ATCU 41 stops functioning while the vehicle is driven at the fourth, fifth or sixth speed gear position, the gear position is switched to the sixth speed. This prevents the down-shift even when the ATCU 41 stops functioning, and prevents the deterioration of the driving performance.

The normal low type abnormality sensing solenoid valve SE senses the stop of the normal function of the ATCU 41, and the normal high type solenoid valves and the normal low type solenoid valves are used as solenoids for driving the friction elements directly. This enables the failsafe operation with a simple circuit structure, and reduces the cost.

The ATCU 41 stops functioning because the ATCU does not function due to something wrong with itself or because the ATCU does not function due to a problem in peripheral equipment which is detected by a sensing device (not shown).

According to the present embodiment, the pressure regulating function of the solenoid valves regulates the oil pressure outputted from the solenoid valves to proper pressure, but the present invention should not be restricted to this. It is also possible to use valves with pressure regulating function and on-off switching solenoids in combination, and manufacture a control device with low price circuit elements. This reduces the manufacturing cost.

What is claimed is:

1. A control device of an automatic transmission, which comprises a plurality of gear position selecting signal pressure generating means (SA, SB, SC, SD) that supplies and releases signal pressure for controlling engagement and disengagement of a plurality of friction elements, and shift control means (41) that controls the gear position selecting signal pressure generating means according to gear positions selected by an automatic shift or a manual shift in order to achieve a plurality of forward driving gear positions by engagement and disengagement of the plurality of friction elements, wherein:

the plurality of forward driving gear positions comprises at least a low speed gear position group composed of multiple forward driving gear positions including a lowest speed gear position and a high speed gear position group composed of multiple forward driving gear positions with higher speeds than the low speed gear position group;

the plurality of gear position selecting signal pressure generating means generates signal pressure to be supplied to friction elements (C1, C2), which are engaged at a predetermined gear position in the low speed gear position group, when the shift control means stops functioning;

the control device of the automatic transmission comprises:

high speed gear position signal pressure generating means (43) that generates signal pressure to be supplied to friction elements (B2, C3), which are engaged at a predetermined gear position in the high speed gear position group;

low speed gear position failsafe means (VA, VB, SE) that supplies the friction elements (C1, C2) which are engaged at the predetermined gear position in the low speed gear position group with the signal pressure generated by the gear position selecting signal pressure generating means if said shift control means stops functioning when said shift control means selects a gear position in said low speed gear position group; and high speed gear position failsafe means (VA, VB, SE) that supplies said friction elements (B2, C3) which are engaged at the predetermined gear position in the high speed gear position group with the signal pressure generated by said high speed gear position signal pressure generating means if said shift control means stops functioning when said shift control means selects a gear position in said high speed gear position group.

2. A control device of an automatic transmission, which comprises a plurality of gear position selecting signal pressure generating means (SA, SB, SC, SD) that supplies and releases signal pressure for controlling engagement and disengagement of a plurality of friction elements, and shift control means (41) that controls said gear position selecting signal pressure generating means according to gear positions selected by an automatic shift or a manual shift in order to achieve a plurality of forward driving gear positions by engagement and disengagement of said plurality of friction elements, wherein:

said plurality of forward driving gear positions comprises at least a low speed gear position group composed of multiple forward driving gear positions including a lowest speed gear position and a high speed gear position group composed of multiple forward gear positions with higher speeds than said low speed gear position group;

said plurality of gear position selecting signal pressure generating means generates signal pressure to be supplied to friction elements (C1, C2), which are engaged at a predetermined gear position in said low speed gear position group, when said shift control means stops functioning;

said control device of the automatic transmission comprises:

high speed gear position signal pressure generating means (43) that generates signal pressure to be supplied to friction elements (B2, C3), which are engaged at a predetermined gear position in said high speed gear position group;

a failsafe valve (VA) that supplies said friction elements which are engaged at the predetermined gear position in said low speed gear position group (C1, C2) with the signal pressure generated by said plurality of gear position selecting signal pressure generating means at a first switching position, and supplies said friction elements (B2, C3) which are engaged at the predetermined gear position in the high speed gear position group with the signal pressure generated from said high speed gear position signal pressure generating means at a second switching position;

a high speed gear position storage valve (VB) that supplies and releases a high speed gear position storage signal pressure for controlling the switching positions of said failsafe valve;

a high speed gear position storage cancel valve (VC) that supplies and releases original pressure of said high speed gear position storage signal pressure to and from said high speed gear position storage valve;

abnormality sensing means (SE) that supplies said failsafe valve with a normal operation signal pressure when said shift control means is operating normally, and stops the supply of said normal operation signal pressure when said shift control means stops functioning;

wherein when said shift control means selects a gear position in a high speed gear position group, said high speed gear position storage valve supplies said high speed gear position storage signal pressure and stores the supplied state of said high speed gear position storage pressure by self-maintaining the switching state by said high speed gear position storage signal pressure, and if said shift control means stops functioning when said shift control means selects a shift position in a high speed gear position group, said high speed gear position storage valve continues supplying said high speed gear position signal pressure;

when said shift control means selects a gear position in said low speed gear position group, said high speed gear position storage cancel valve stops supplying said original pressure of said high speed gear position storage signal pressure to thereby cancel the self-maintenance of the switching state in said high speed gear position storage valve and cancel the storage of the supplied state of said high speed gear position storage signal pressure; and if said normal operation signal pressure is only supplied or if neither said normal operation signal pressure nor said high speed gear position storage signal pressure are supplied, said failsafe valve is switched to a first switching position, and if said high speed gear position storage signal pressure is only supplied, said failsafe valve is switched to a second switching position.

3. A control device of an automatic transmission according to claim 1, wherein said plurality of gear position selecting signal pressure generating means (SA, SB, SC, SD) generates signal pressure to be supplied to friction elements (C1, C2), which are engaged at the highest speed gear position in said low speed gear position group, when said shift control means (41) stops functioning.

4. A control device of an automatic transmission, which comprises a plurality of gear position selecting signal pressure generating means (SA, SB, SC, SD) that supplies and releases signal pressure for controlling engagement and disengagement of a plurality of friction elements, and shift control means (41) that controls said gear position selecting signal pressure generating means according to gear positions selected by an automatic shift or a manual shift in order to achieve a plurality of forward driving gear positions by engagement and disengagement of said plurality of friction elements, wherein:

said plurality of forward driving gear positions comprises at least a low speed gear position group composed of multiple forward driving gear positions including a lowest speed gear position and a high speed gear position group composed of multiple forward gear positions with higher speeds than said low speed gear position group;

said plurality of gear position selecting signal pressure generating means generates signal pressure to be supplied to friction elements (C1, C2), which are engaged at a highest speed gear position in said low speed gear position group, when said shift control means stops functioning;

said control device of the automatic transmission comprises:

high speed gear position signal pressure generating means (43) that generates signal pressure to be supplied to friction elements (B2, C3), which are engaged at a highest speed gear position in said high speed gear position group;

a failsafe shift valve (VA) that supplies said friction elements (C1, C2) with the signal pressure generated by said plurality of gear position selecting signal pressure generating means at a first shift position, and supplies said friction elements (B2, C3) with the signal pressure generated from said high speed gear position signal pressure generating means at a second shift position;

a high speed gear position storage shift valve (VB) that supplies and releases a high speed gear position storage signal pressure for controlling shift positions of said failsafe shift valve;

a high speed gear position storage cancel valve (VC) that supplies and releases original pressure of the high speed gear position storage signal pressure to and from said high speed gear position storage shift valve;

abnormality sensing means (SE) that supplies said failsafe shift valve and said high speed gear position storage cancel shift valve with normal operation signal pressure for controlling shift positions when said shift control means is operating normally, and stops supplying said normal operation signal pressure when said shift control means stops functioning;

high speed gear position selecting signal pressure generating means (SD) that supplies said high speed gear position storage shift valve and said high speed gear position storage cancel shift valve with high speed gear position selecting signal pressure for controlling shift positions when said shift control means selects a gear position in said high speed gear position group;

wherein said high speed gear position storage cancel shift valve supplies said high speed gear position storage shift valve with said original pressure of said high speed gear position storage signal pressure when both said normal operation signal pressure and said high speed gear position selecting signal pressure are supplied or when neither said normal operation signal pressure nor said high speed gear position selecting signal pressure are supplied;

said high speed gear position storage shift valve controls shift positions thereof by said high speed gear position storage signal pressure, and supplies said high speed gear position storage signal pressure to said failsafe shift valve when said high speed gear position selecting signal pressure and said original pressure of said high speed gear position storage signal pressure are supplied or when the supply of said high speed gear position selecting signal pressure is stopped in a state wherein said high speed gear position selecting signal pressure and said original pressure of said high speed gear position storage signal pressure are supplied; and if said normal operation signal pressure is only supplied or if neither said normal operation signal pressure nor said high speed gear position storage signal pressure are supplied, said failsafe shift valve is switched to the first shift position, and if said normal operation signal pressure is not supplied and said high speed gear position storage signal pressure is only supplied, said failsafe shift valve is switched to the second shift position.

5. A control device of an automatic transmission according to claim 2, 3, or 4 wherein:

when said shift control means stops functioning no current is supplied from all outputs thereof, and said abnormality sensing means (SE) is a normal low type solenoid valve that supplies no signal pressure when no current is supplied.

6. A control device of an automatic transmission according to claim 3, or 4 wherein:

when said shift control means stops functioning no current is supplied from all outputs thereof;

said plurality of gear position selecting signal pressure generating means comprises normal high type solenoid valves (SA, SB), which supply oil pressure in a state wherein no current is supplied, and normal low type solenoid valves (SC, SD), which supply no signal pressure in a state wherein no current is supplied; and said normal high type solenoid valves generate signal pressure to be supplied to said friction elements (C1, C2), which are engaged at the highest speed gear position in said low speed gear position group.

\* \* \* \* \*